United States Patent [19]
Rigsby

[11] Patent Number: 5,445,350
[45] Date of Patent: Aug. 29, 1995

[54] ADJUSTABLE CONTAINER HOLDER

[76] Inventor: Kenneth D. Rigsby, 7911 Dunbarton, Los Angeles, Calif. 90045

[21] Appl. No.: 268,284

[22] Filed: Jun. 30, 1994

Related U.S. Application Data

[63] Continuation-in-part of Ser. No. 88,223, Jul. 6, 1993, abandoned.

[51] Int. Cl.⁶ .................................................. A47K 1/08
[52] U.S. Cl. ...................... 248/313; 224/552; 224/570; 224/554; 248/311.2
[58] Field of Search ............... 248/311.2, 313, 316.4, 248/154; 224/42.43, 42.45 R, 275, 281, 282; 297/194; 108/26

[56] References Cited

U.S. PATENT DOCUMENTS

| | | | |
|---|---|---|---|
| D. 331,175 | 11/1992 | Jones . | |
| 2,321,824 | 6/1943 | Knight | 248/154 |
| 4,586,687 | 5/1986 | Ziaylek | 248/313 |
| 4,693,440 | 9/1987 | Lalonde . | |
| 4,783,037 | 11/1988 | Flowerday . | |
| 4,892,281 | 1/1990 | DiFilippo | 248/316.4 X |
| 4,943,111 | 6/1990 | VanderLaan . | |
| 4,948,080 | 8/1990 | Jack | 248/311.2 |
| 4,981,277 | 1/1991 | Elwell . | |
| 5,007,610 | 4/1991 | Christiansen | 248/313 X |
| 5,024,411 | 6/1991 | Elwell . | |
| 5,033,709 | 7/1991 | Yuen | 248/316.4 X |
| 5,054,733 | 10/1991 | Shields | 248/154 X |
| 5,060,899 | 10/1991 | Lorence | 224/42.45 R X |
| 5,071,096 | 12/1991 | Hartman | 248/154 |
| 5,072,909 | 12/1991 | Huang . | |
| 5,081,478 | 1/1992 | Hayashida | 248/187 |
| 5,104,185 | 4/1992 | Christiansen . | |
| 5,143,338 | 9/1992 | Eberlin | 248/313 |
| 5,149,032 | 9/1992 | Jones . | |
| 5,154,380 | 10/1992 | Risca . | |
| 5,167,392 | 12/1992 | Henricksen . | |
| 5,171,061 | 12/1992 | Marcusen | 248/311.2 |
| 5,195,711 | 3/1993 | Miller | 248/313 |

*Primary Examiner*—J. Franklin Foss
*Attorney, Agent, or Firm*—Ashok K. Janah

[57] ABSTRACT

An adjustable container holder of the present invention comprises a fixed jaw and a movable jaw, the jaws having mutually opposed arcuate surfaces that define an adjustable aperture. An adjusting knob can move the movable jaw toward and apart from the fixed jaw, so that the adjustable aperture defined by the arcuate jaw surfaces can be adjusted to grasp containers having differing sizes.

12 Claims, 3 Drawing Sheets

ADJUSTABLE CONTAINER HOLDER

CROSS-REFERENCE

This application is a continuation-in-part of application Ser. No. 08/088,223, filed on Jul. 6, 1993 by Kenneth D. Rigsby now abandoned.

BACKGROUND

The present invention relates to an adjustable container holder for holding containers of differing sizes.

Container holders are used in moving vehicles and the like, to hold containers such as cups, mugs and beverage cans, so that the contents of the containers do not spill while the vehicle is in transit. The containers are typically held within apertures in the container holders. Since containers often have differing diameters and sizes, container holders that have fixed sized apertures cannot securely grasp many types of containers.

Adjustable container holders were developed to hold containers having differing sizes. However, existing adjustable container holders have many disadvantages. Some container holders are adjustable only in fixed increments corresponding to the sizes of common beverage containers, and are unable to securely grasp containers having unusual or uncommon sizes. Other holders are bulky and occupy excessive space in small vehicles. Another disadvantage of many holders is that the user has to use both hands to operate the adjusting mechanism, which is difficult to do when the vehicle is in motion.

Thus, an adjustable container holder that can adjustably securely grasp containers having differing and uncommon sizes, that has a thin streamlined design, and that can be operated by a single hand is desirable.

SUMMARY

The present invention satisfies these needs. An adjustable container holder of the present invention comprises a fixed jaw and a movable jaw, the jaws having mutually opposed arcuate surfaces that define an adjustable aperture. An adjusting knob can move the movable jaw toward and apart from the fixed jaw, so that the adjustable aperture defined by the arcuate jaw surfaces can be adjusted to grasp containers having differing sizes.

Preferably, a housing with an opening therethrough encloses the jaws. The opening in the housing is substantially aligned with the adjustable aperture between the jaws, so that a container held within the jaws, can extend partially or entirely through the opening in the housing.

In a preferred embodiment for adjusting the movable jaw toward and apart from the fixed jaw, the fixed jaw has a pair of spaced apart holes therethrough, and the movable jaw has a pair of spaced apart and threaded holes therethrough. A pair of rods fit within the holes of the jaws, each rod comprising a first smooth portion rotably mounted in the holes in the fixed jaw, and a second threaded portion that threadingly engages the threaded holes in the movable jaw. The adjusting knob engages the two rods so that adjustment of the knob in one direction causes the movable jaw to move toward the fixed jaw, and adjustment of the knob in the other direction causes the movable jaw to move apart from the fixed jaw.

DRAWINGS

These and other features, aspects and advantages of the present invention will become better understood with regard to the following description, appended claims, and accompanying drawings, where:

DESCRIPTION

Figure 1:
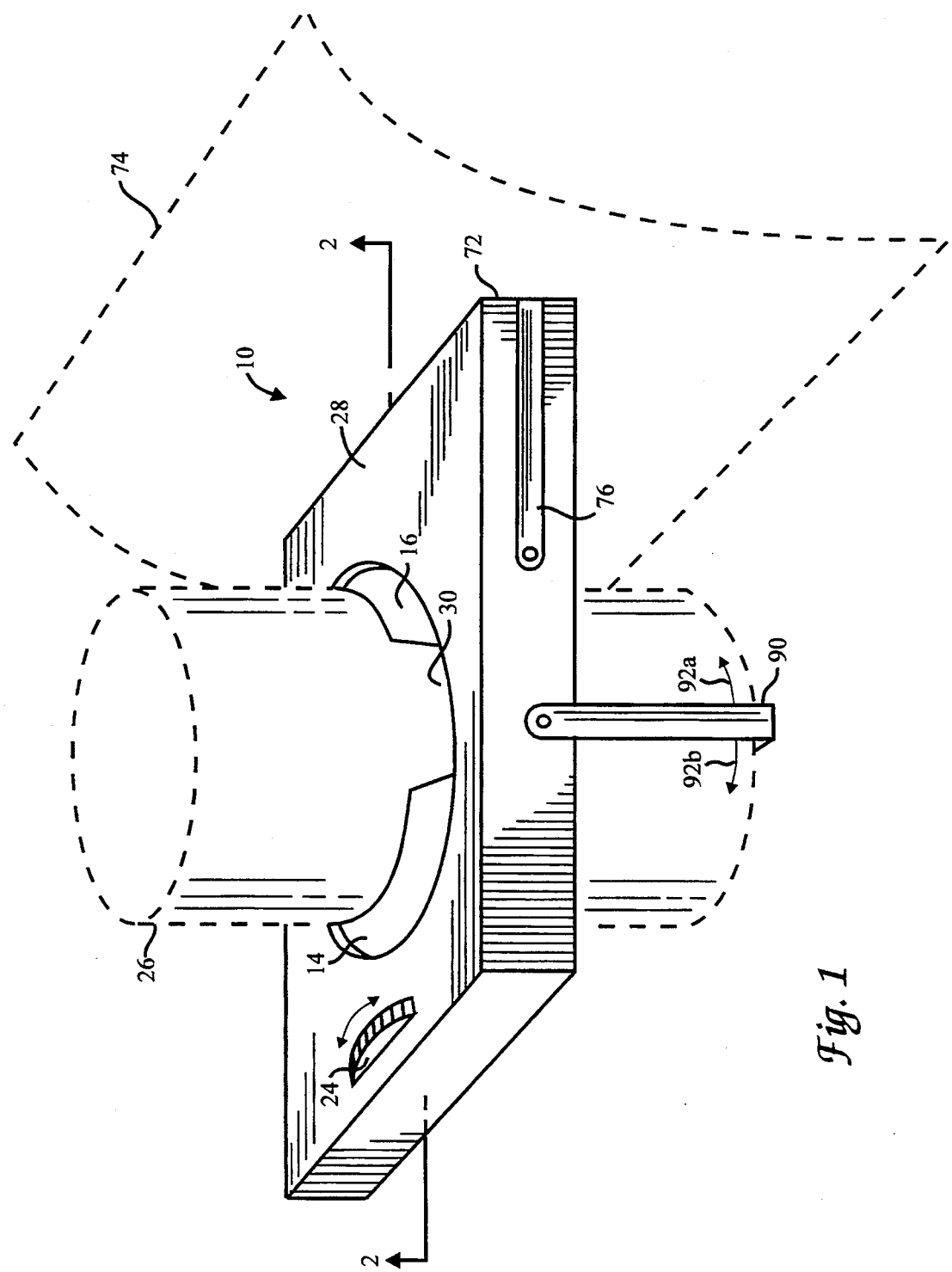
FIG. 1 is a perspective view of an adjustable container holder of the present invention within a housing, showing the container holder holding a container.

An adjustable container holder 10 of the present invention comprises a fixed jaw 14 and a movable jaw 16. The fixed jaw 14 and movable jaw 16 have mutually opposed arcuate surfaces 20a and 20b. The arcuate surfaces 20a and 20b define an adjustable aperture 22. An adjusting knob 24 allows movement of the movable jaw 16 toward and apart from the fixed jaw 14, so that the aperture 22 defined by the arcuate jaw surfaces 20 can be adjusted to grasp containers 26 of differing sizes. Preferably, the fixed jaw 14 and the movable jaw 16 are within a housing 28 having an opening 30 therethrough, as shown in FIG. 1. When a housing 28 is used, the aperture 22 defined by the arcuate jaw surfaces 20a and 20b is substantially aligned with the opening 30 in the housing 28, and a portion of the adjusting knob 24 extends out of the housing 28.

Either of the jaws 14 or 16 can be fixed or movable. In the embodiment shown in the drawings, the jaw 14 supporting the adjusting knob 24 is the fixed jaw 14, and the other jaw 16 is movable. However, alternate versions of the invention can comprise a support member (not shown) for supporting the adjusting knob 24, so that either of the jaws can be movable.

Either of the jaws 14 or 16 can comprise a slot 31 which is sized to fit around the handle (not shown) of a container 26 grasped by the jaws. For example, when the container 26 comprises a mug with a handle, the handle of the mug can fit in the slot 31.

A preferred mechanism that allows the adjusting knob 24 to engage, and allow adjustment of, the movable jaw 16 is described below. In this preferred embodiment, the fixed jaw 14 has a pair of spaced apart holes 32 therethrough. Typically, the holes 32 through the fixed jaw 14 are smooth and without any threading. The movable jaw 16 also has a pair of spaced apart threaded holes 34a, 34b therethrough. In the embodiment shown herein, the thread in the holes 34 are right-to-left thread.

A pair of rods 44a, 44b each have a first end 46 contiguous to a smooth portion 50, and a second end 51a, 51b contiguous to a threaded portion 52a, 52b with a thread 53a, 53b thereon. The rods 44 are mounted substantially perpendicularly to the jaws 14 and 16. The smooth portion 50a, 50b of the rods 44 are inserted in the holes 32a and 32b respectively, of the fixed jaw 14, and the first end 46a, 46b of the rods 44 extend outwardly from the fixed jaw 14. The threaded portion 52a, 52b of the rods 44 are inserted in the holes 34a, 34b of the movable jaw 16, and threadingly engage the threads of the holes 34. The second ends 51a, 51b of the rods 44 extend outwardly from the movable jaw 16.

When the rods 44 are rotated, the movable jaw 16 moves towards either toward or apart from the fixed jaw 14, depending on the direction in which the rods 44 are rotated.

When a housing is used, optionally, the second ends 51 of the rods 44 are rotably supported by a support member 54 which is mounted in the housing 28. The support member 54 substantially precludes flexing of the rods 44.

An adjusting knob 24 engages the two rods 44 so that adjustment of the knob 24 causes the rods 44 to rotate, thereby adjusting the aperture 22 between the arcuate surfaces 20a and 20b of the jaws 14 and 16, to accommodate containers 26 having differing sizes. The fixed jaw 14 can serve as a support member for supporting the adjusting knob 24 and the adjusting mechanism that engages the adjusting knob 24 to the movable jaw 16. Alternatively, the adjusting knob 24 and mechanism can be supported by a support member (not shown) adjacent to the fixed jaw 14.

Figure 2:
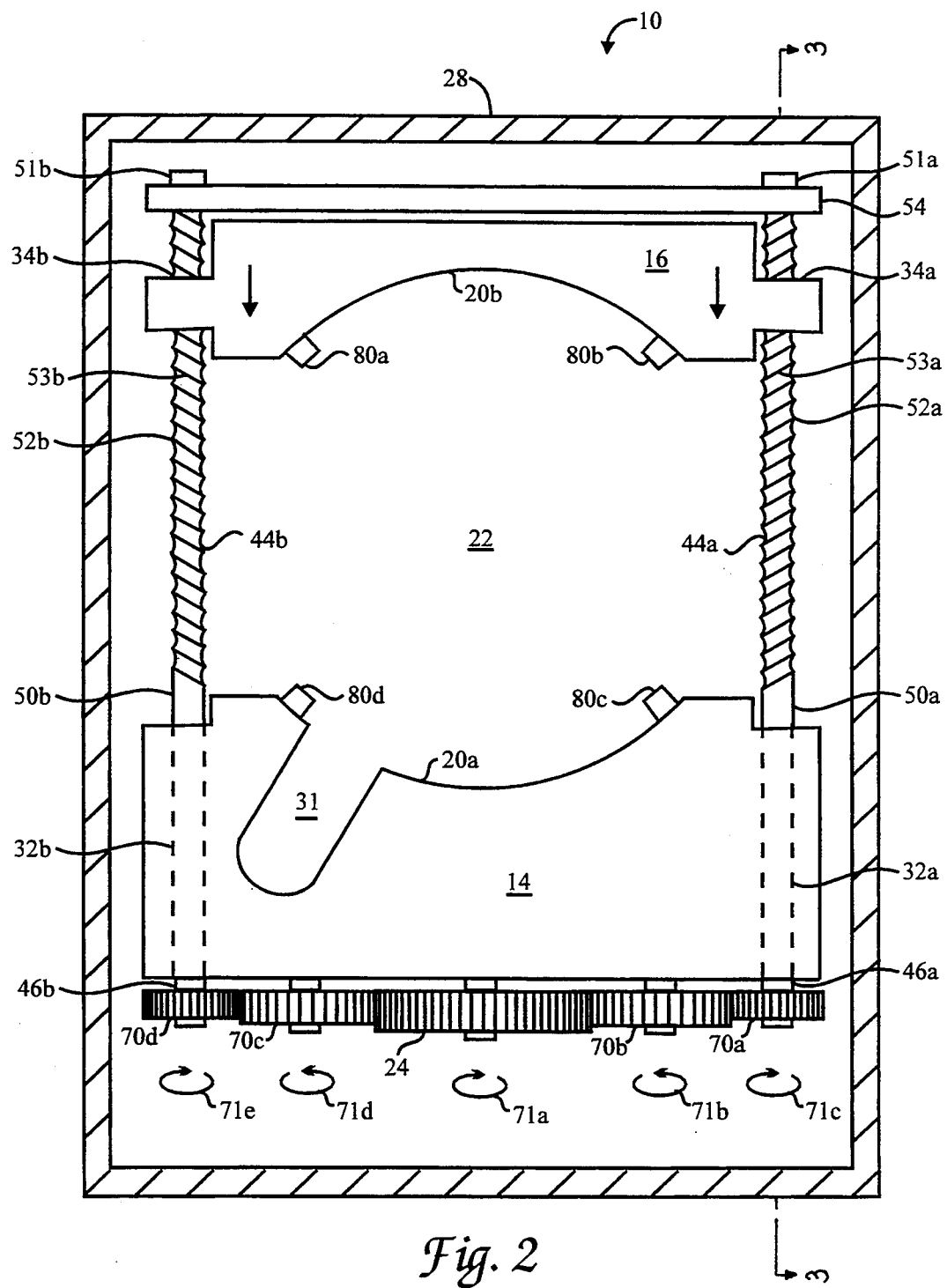
FIG. 2 is a top elevation partial sectional view of the container holder of FIG. 1, taken along line 2—2 of FIG. 1.
Figure 3:
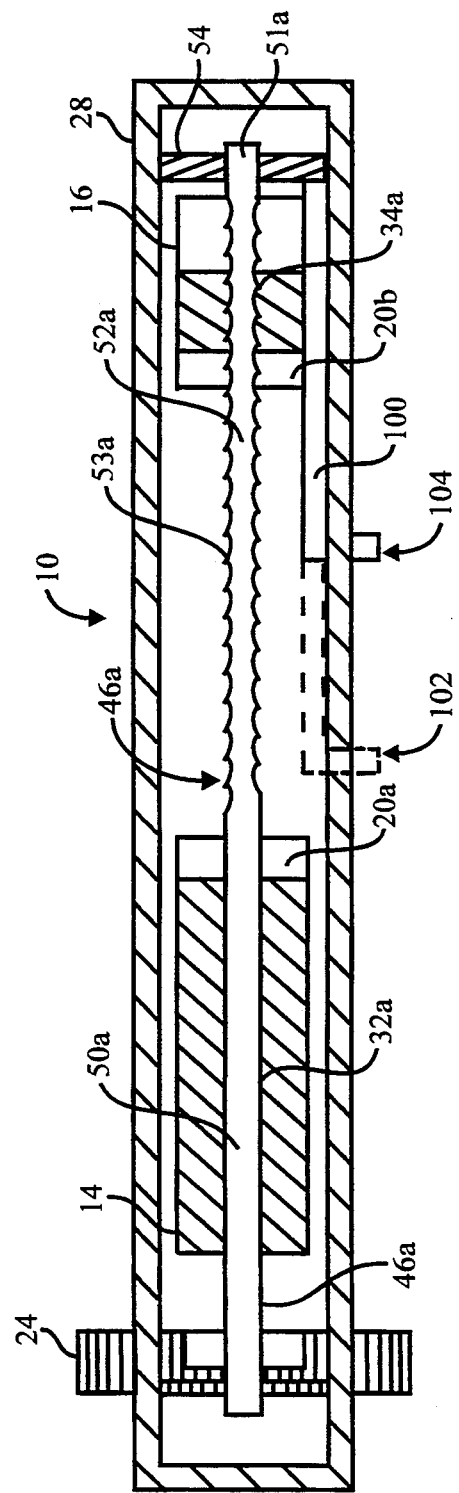
FIG. 3 is a side elevation partial sectional view of the container holder of FIG. 1, taken along line 3—3 of FIG. 2.

Any conventional mechanism, such as for example, gears or pulleys, can be used to engage the adjusting knob 24 to the rods 44 so that adjustment of the knob 24 causes the rods 44 to rotate. Preferably, the adjustment knob 24 engages the rods 44 through a plurality of gears 70. Preferably, the gears 70 are rotably attached to the fixed jaw 14, and comprise at least four gears. Two of the gears 70a and 70d are mounted on the first ends 46 of the rods 44. Two additional gears 70b and 70c are rotably mounted on the first jaw 14 and are positioned between, and engage, the adjusting knob 24 and the gears 70a and 70d, respectively, as shown in FIG. 2. The gears 70 can all have the same number of teeth and the same diameter, or the gears 70 can have different numbers of teeth and different diameters. When the adjusting knob 24 is rotated in the direction shown by the arrow 71a, the gears 70 rotate in the directions shown by the arrows 71b, 71c, 71d and 71e as shown, thereby causing the rods 44a, 44b to also rotate along the direction of the arrows 71c and 71e respectively, causing the movable jaw 16 to move apart from the fixed jaw 14. Conversely, when the adjusting knob 24 is rotated in the opposing direction, the movable jaw 16 moves toward the fixed jaw 14.

Alternatively (not shown), the adjusting knob 24 can also engage the two rods 44 through a plurality of pulleys rotably attached to the fixed jaw 14, with a belt connecting the pulleys to the adjusting knob 24. The pulleys can replace the gears 70.

Preferably, the adjustable container holder 10 is sized so that the holder 10 can be retracted into a slot 72 in the interior 74 of a vehicle, and preferably, a retractor assembly 76 can be used for extending and retracting the holder 10 from a slot 72 in the vehicle. The retractor assembly 76 can be mounted on the side of the housing 28, as shown in FIG. 1.

Preferably, the arcuate surfaces 20a and 20b of the fixed jaw 14 and the movable jaw 16 have a plurality of rubber tips 80 mounted thereon, so that the container 26 within the aperture 22 can be securely grasped.

Preferably, the holder 10 can also comprise a base 90 for supporting a container 26. The base 90 can be pivotally attached to the housing 28 as shown in FIG. 1, so that the base 90 can be extended downwardly from the housing 28 to support the container 26. The arrows 92a, 92b show the direction of movement of the base 90. Alternatively, the holder 10 can comprise a retractable support plate 100 mounted in the bottom of the housing 28, the plate 100 having an extended position 102 in which the plate extends below the adjustable aperture 22 so that the plate 100 can support a container 26 grasped in the aperture, and a retracted position 104 in which the plate 100 retracts into the housing 28.

Preferably, all the components of the holder 10 are formed from a polymeric material, such as plastic, using conventional die casting, molding or machining techniques. The use of polymeric materials precludes rusting of the components of the holder 10. Die casting is a convenient method of fabricating the components. Instead of plastic, some or all of the components of the holder 10 can also be made from a metal such as steel, aluminum, or from metallic alloys.

Although the present invention has been described in considerable detail with regard to the preferred version thereof, other versions are possible. Therefore, the appended claims should not be limited to the description of the preferred versions contained herein.

What is claimed is:

1. An adjustable container holder comprising:
   (a) a fixed and a movable jaw, the jaws having mutually opposed arcuate surfaces that define an adjustable aperture, the fixed jaw having a pair of spaced apart holes therethrough, in the movable jaw having a pair of spaced apart threaded holes therethrough;
   (b) a pair of rods, the rods each having a threaded portion that threadingly engages the threaded holes in the movable jaw, and a smooth portion that is rotably mounted in the holes of the fixed jaw;
   (c) an adjusting knob engaging the rods via adjusting means so that when the adjusting knob is adjusted in one direction, the movable jaw moves towards the fixed jaw, and when the adjusting knob is adjusted in the opposing direction, the movable jaw moves apart from the fixed jaw, so that the adjustable aperture defined by the arcuate jaw surfaces can be adjusted to grasp containers of differing sizes.

2. The container holder of claim 1, wherein the adjusting means comprises a plurality of gears.

3. The container holder of claim 2, wherein the gears are rotably attached to the fixed jaw.

4. The container holder of claim 1, wherein the adjusting means comprises a plurality of pulleys.

5. The container holder of claim 4, wherein the pulleys are rotably attached to tile fixed jaw.

6. The container holder of claim 1, wherein the fixed and movable jaws are mounted in a housing having an opening therethrough, and wherein the adjustable aperture between the jaws is substantially aligned with the opening in the housing.

7. The container holder of claim 1, wherein the container holder further comprises a support member, and wherein the ends of the rods that are contiguous to the threaded portions of the rods are rotably mounted in the support member.

8. The container holder of claim 1, wherein the container holder is sized to be retracted into a slot in the interior of a vehicle, and wherein the holder further comprises a retractor assembly adapted for extending and retracting the holder from the slot in the vehicle.

9. The container holder of claim 1, further comprising a base for supporting a container, the base pivotally attached to the housing so that the base can be extended downwardly from the housing to support a container.

10. The container holder of claim 1, further comprising a retractable support plate mounted in the housing, the plate having an extended position in which the plate extends below the adjustable aperture, so that the plate can support a container grasped in the aperture, and a retracted position in which the plate retracts into the housing.

11. The container holder of claim 1, further comprising a plurality of rubber tips for securely grasping containers, the rubber tips mounted in the arcuate surfaces of the fixed and movable jaws.

12. The container holder of claim 1, wherein at least one of the jaws comprises a slot which is sized to fit around a handle of a container grasped by the jaws.

* * * * *